INVENTOR
Charles M. Hill
BY
Robert W. Hampton

June 18, 1957 C. M. HILL 2,796,219

WORD COUNTER

Filed Dec. 28, 1953 3 Sheets-Sheet 2

INVENTOR
Charles M. Hill.
BY
Robert W. Hampton

June 18, 1957 C. M. HILL 2,796,219

WORD COUNTER

Filed Dec. 28, 1953 3 Sheets-Sheet 3

INVENTOR

Charles M. Hill.

BY

Robert W. Hampton

United States Patent Office 2,796,219

Patented June 18, 1957

2,796,219

WORD COUNTER

Charles M. Hill, Alameda County, Calif., assignor to Marchant Research, Inc., a corporation of California Application December 28, 1953, Serial No. 400,521

11 Claims. (Cl. 235—61)

The present invention relates to electronic digital computers and more particularly to special purpose adder circuits for use in such computers.

Binary adder circuits, such as those more fully described in the copending application Serial No. 344,025 filed March 23, 1953, by George B. Greene and the copending application Serial No. 400,522, filed on even date herewith by Charles M. Hill, the latter now being Patent No. 2,715,997, granted August 23, 1955, are employed in the main arithmetic organs of electronic digital computers. It is frequently desirable to provide additional special purpose adders which can perform certain simplified operations concurrent with the operation of the main adder circuits. The present adder circuits may be used: to add an increment of +1 or −1 to the lowest order of a binary word; or to combine +1 or −1 with a binary word in some particular order other than that of least significance, thereby increasing or decreasing the value of the word by a binary value 10, 100, 1000, etc.; or to count the number of times a particular operation occurs.

Therefore, an object of the present invention is to provide a simplified adder for arithmetically combining the value 1 with a binary word.

It is a more particular object of the present invention to provide means employing an upcount non-coincidence adder to add 1 to a word.

A further object of the present invention is to provide means employing a downcount non-coincidence adder to add −1 to a word.

A further object of the present invention is to provide means employing a downcount non-coincidence adder to add −1 to any order of a word.

Another object of the present invention is to provide means employing a non-coincidence adder to count the number of times an arithmetic operation occurs.

A further object of the present invention is to provide means employing a non-coincidence adder to selectively add either +1 or −1 to any order of a binary word and to provide various output representations of the sum word.

The underlying principle of the present invention is therefore the application of pulse counting techniques to the combining of +1 or −1 with a binary word.

Other objects and principles will appear from the following description in which reference is made to the accompanying drawings, wherein.

The present adders are hereinafter described in the environment of a serial type time base computer using binary trigger circuit shift registers for internal memory, but they may be used in any type of device wherein a binary word is represented by a sequence of pulses.

GENERAL DESCRIPTION

Figure 5:
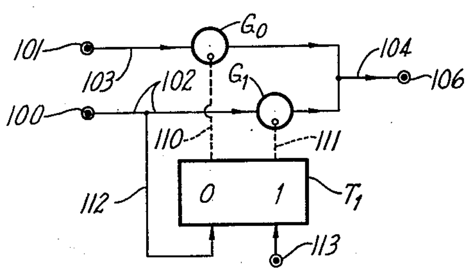
Fig. 5 is a block diagram of an upcount one-adder.

Shift registers of the type illustrated in Fig. 5 of copending application Serial No. 399,767, filed December 22, 1953, by David S. Nee are used to receive, temporarily store, and transmit multidigit binary words which are employed in the operation of electronic digital computers. In serial computers, binary words occur in regularly spaced intervals called "word times," each word time being divided into a number of substantially equal time intervals called "digit intervals." In some cases it is convenient to represent a word by a pulse sequence on a single-lead channel, wherein the presence of a pulse during a digit interval represents the digit 1, and the absence of a pulse during that interval represents the digit 0. An alternate method of representing a word is by employing a two-lead channel, wherein a pulse on one lead during a digit interval represents a 0 and a pulse on the other lead during that interval represents a 1. The input to a shift register may be through either a one-lead channel or a two-lead channel. In either case, words are entered into a shift register digit-by-digit, with the least significant digit first entered into the highest stage of the register and then shifted to the next lower stage in response to the first of a series of "shift pulses," one shift pulse occurring during each digit interval. The first shift makes the highest stage available for the next digit of the input word. The second and successively higher order digits are similarly shifted into the higher stages of the register; therefore, at the end of a word time, a complete word has been shifted into the register with the least significant digit in the lowest register stage. Similarly, a word may be shifted out of the register, lowest order first, in one word time, and the output may be through either a one-lead channel or a two-lead channel. The register employed in the present invention receives words through a one-lead channel and transmits them through a two-lead channel.

A binary word, or operand, which is to be combined with a +1 or −1, may be entered into a shift register and then shifted out of the register, digit-by-digit, through the one-adder which produces the sum at its output. Each ordinal operation is performed within a digit interval so that the sum word can be shifted into another register, or back into the original register. As the sum word is shifted out of the register, the higher stages of that register become available to receive the lower order sum digits from the adder.

The combination of +1 or −1 with a binary operand is performed in accordance with the rules of binary arithmetic, wherein: +1 added to 0 produces a sum of 1; +1 added to +1 produces a sum of 0 and a carry of +1 to be added in the next higher order of the augend; −1 added to +1 produces a sum of 0; and −1 added to 0 produces a sum of −1 and a carry of −1 to be added in the next higher order of the augend. Since in the present upcount one-adder the addend is always +1, the binary addition becomes simplified. Unless a carry occurs in the lowest order, there can be no carry; but if a carry does occur in the lowest order, it continues throughout all of the consecutively higher orders in which the augend digits are 1's. Similarly, in the downcount one-adder, unless a carry occurs in the lowest order, there can be no carry; but if a carry does occur in the lowest order, it continues throughout all of the consecutively higher orders in which the augend digits are 0's.

The particular manner in which the present adders perform the above operations will be set forth following a brief description of the circuit elements employed in the present invention.

CIRCUIT ELEMENTS

*Bistable circuit*

One of the basic elements employed in the present invention is a circuit having two stable states of operation such, for example, as the well-known Eccles-Jordan vacuum tube trigger circuit, described in "Theory and Application of Electron Tubes" by H. J. Reich. In one of its simplest forms, a trigger circuit comprises two triode vacuum tubes with the grid of each tube cross-coupled to the anode of the other tube through a respective network comprising a resistor in parallel with a capacitor. Such a circuit has two stable operating conditions, namely, with either of the two tubes conducting and its companion tube non-conducting.

Figure 1:
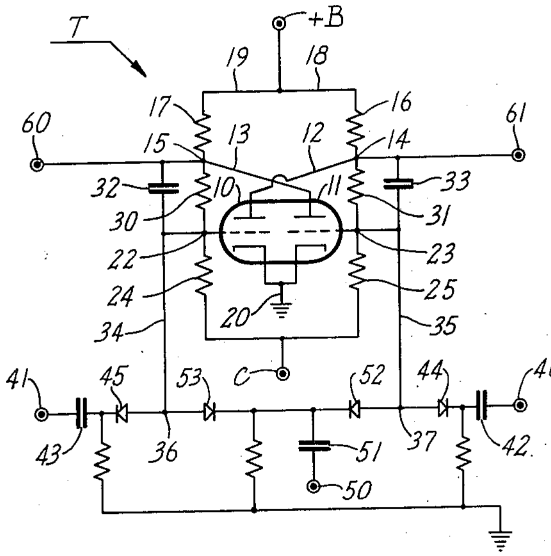
Fig. 1 is a wiring diagram of a typical trigger circuit as employed in the present invention.

A modification of the Eccles-Jordan circuit is shown as T in Fig. 1. The trigger circuit T comprises two vacuum triodes 10 and 11, shown for convenience as the two sections of a twin triode. The lefthand tube 10 is hereinafter called the "0 side," and the trigger is said to be "reset" when the 0 side is conducting. The righthand tube 11 is hereinafter called the "1 side," and the trigger is said to be "set" when the 1 side is conducting.

The anode of the 0 side of the trigger is connected by a lead 12, a junction 14, a resistor 16, and a lead 18 to a terminal +B which is a source of positive potential. Similarly, the anode of the 1 side of the trigger is connected by a lead 13, a junction 15, a resistor 17, and a lead 19 to the terminal +B. The cathodes of both sides are connected by a common cathode lead 20 to ground.

The grid of the 0 side, hereinafter called the "0 grid," is connected through a junction 22 and a resistor 24 to a terminal −C which is source of negative grid bias. The 1 grid is similarly connected through a junction 23, and a resistor 25 to the terminal −C. The 0 grid is also connected by means of junction 22, a resistor 30 in parallel with a capacitor 32, junction 15, and lead 13, to the 1 anode. The 1 grid is similarly connected by means of junction 23, a resistor 31 in parallel with a capacitor 33, junction 14, and lead 12, to the 0 anode.

A "set" input terminal 41 is connected by a capacitor 43, a diode 45, a junction 36, a lead 34, and junction 22, to the 0 grid, and a "reset" input terminal 40 is connected by a capacitor 42, a diode 44, a junction 37, a lead 35, and junction 23, to the 1 grid. A "symmetrical" input terminal 50 is connected through a capacitor 51, a pair of diodes 52 and 53, and junctions 37 and 36, respectively, to both the 0 and 1 grids.

A negative pulse applied to the symmetrical terminal 50 invariably reverses the trigger as follows: Assuming that the 0 side is initially conducting, a negative pulse applied to termnal 50 is transmitted through diode 53 to the 0 grid, but is blocked from the 1 grid for the following reasons. Since the 0 side is conducting, junction 23 is at a relatively low potential. The circuit parameters and the potential value of the grid bias source −C are so chosen that the relatively low potential of junction 23 is below ground potential by an amount at least equal to the value of the input pulses applied to terminal 50. Therefore, the potential of the lefthand side of diode 52 cannot drop below the potential of the righthand side of that diode in response to the pulse applied to terminal 50, and the pulse is blocked. Similarly, if the 1 side is conducting, diode 53 blocks a pulse applied to terminal 50. The negative pulse applied to the 0 grid decreases the conduction of the 0 side, so that the potential at junction 14 rises. This rise in potential is coupled by capacitor 33 to the 1 grid to initiate conduction of the 1 side. The conduction of the 1 side lowers the potential at junction 15, thereby lowering the 0 grid potential to further reduce the conduction of the 0 side. Conduction increases in the 1 side and decreases in the 0 side until a stable state is reached with the 1 side conducting at saturation and the 0 side fully cut off. Each subsequent negative pulse applied to terminal 50 similarly reverse conduction from one side to the other.

A negative pulse applied to the set terminal 41 sets the trigger to 1 if it is conducting on the 0 side, but has no effect on the trigger if it is already set to 1. Assuming once again that the trigger is conducting on the 0 side, a negative pulse applied to terminal 41 is coupled by capacitor 43, diode 45 and lead 34 to the 0 grid. Diode 53 blocks this pulse from the 1 grid. The negative pulse on the 0 grid causes conduction to reverse from the 0 side to the 1 side in the manner hereinbefore described. Similarly, a negative pulse applied to the reset terminal 40 resets the trigger to 0 if it is conducting on the 1 side, but has no effect on the trigger if it is already reset to 0.

The trigger circuit is adapted to control other devices by means of the changing potential levels at junctions 14 and 15. When the trigger stands reset to 0, the potential at junction 15 is relatively high while the potential at junction 14 is relatively low, the converse being true when the trigger stands set to 1. A pair of control output terminals 60 and 61, which are connected to junctions 15 and 14 respectively, are used for applying these potentials to other devices.

Figure 2:
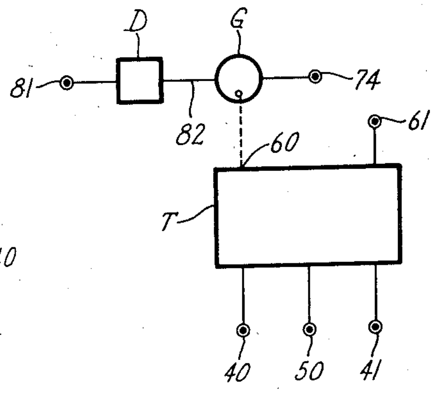
Fig. 2 is a block diagram illustrating the relationship between the circuit elements shown in Figs. 1, 3 and 4.

In Fig. 2, the trigger circuit T is shown as a rectangle with the symmetrical input terminal 50 at the bottom center of the rectangle and the reset and set input terminals 40 and 41 at the bottom left and bottom right of the rectangle, respectively. The control output terminals 60 and 61 are shown at the top left and top right of the rectangle, respectively.

*Gate*

Figure 3:
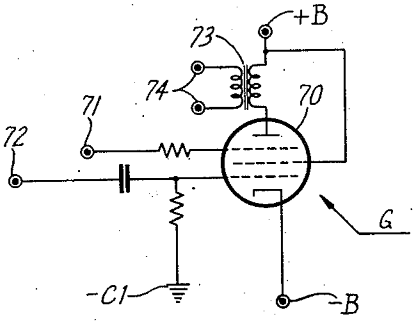
Fig. 3 is a wiring diagram of a typical gate as employed in the present invention.

A second element employed in the present invention is a transducer, an example of which is the well-known pentode gate shown as G in Fig. 3. Gate G comprises a vacuum pentode 70 which is normally biased well below cutoff by means of a control grid bias source $-C_1$. The bias of tube 70 can be raised to slightly below cutoff by means of a single arming control comprising a terminal 71 which is connected to the suppressor grid of the tube. In the present invention, each gate G is controlled by a trigger circuit, terminal 71 of the gate being connected to the appropriate control output terminal 60 or 61 of the trigger circuit (Fig. 1). When the control potential of the related output terminal 60 or 61 is low, tube 70 is biased well below cutoff, and the gate is said to be "closed"; conversely, when the control potential becomes high, the bias of the tube 70 is raised to slightly below cutoff, and the gate is said to be "armed." Gate G is interrogated by positive pulses applied to a terminal 72 which is capacitively coupled to the control grid of the tube. If the gate is interrogated while it is closed, tube 70 remains cut off; but if the gate is interrogated while it is armed, the tube conducts, thereby energizing the primary winding of a pulse transformer 73 in the discharge circuit of the tube. According to the desired polarity of an output pulse from the gate, such a pulse may be taken from either of a pair of terminals 74 which are connected to opposite ends of the secondary winding of transformer 73.

In Fig. 2, a gate G is shown as a circle having within it a smaller circle connected to the control output terminal 60 of the trigger circuit T. This represents a typical arming connection from a trigger, and indicates that gate G is armed when and only when the trigger T stands reset to 0. In the accompanying drawings, control leads are shown as broken lines, whereas pulse leads are shown as solid lines.

*Delay circuit*

Figure 4:
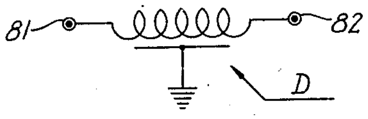
Fig. 4 is a schematic wiring diagram of a typical delay circuit as employed in the present invention.

A third element employed in the invention is a delay circuit, a typical example of which is shown schematically in Fig. 4 as a distributed parameter delay line of the type disclosed in Fig. 5 of U. S. Patent No. 2,467,857, issued April 19, 1949, to J. H. Rubel et al., to which reference is made for a full description. It is to be understood that other delay circuits, such as lumped parameter delay lines may be employed. Pulses impressed upon an input terminal 81 of delay line D are delayed for a few microseconds or a fraction of a microsecond and appear at an output terminal 82. In Fig. 2, a delay circuit D is shown as a small square.

UPCOUNT ONE-ADDER

Referring to Fig. 5, the upcount one-adder comprises: an input channel into which an augend is entered; an output channel through which the sum is transmitted; a pair of gates which may be controlled for connecting the input channel to the output channel; and a trigger circuit into which an addend of +1 may be entered for controlling the gates and in which carry values may be stored.

An augend is entered into the adder through a two-lead channel. Pulses representing binary 0's are applied to a first input terminal 100, while pulses representing binary 1's are applied to a second input terminal 101. Terminal 100 is connected by a lead 102 to the input of a gate $G_1$. Similarly, terminal 101 is connected by a lead 103 to the input of a gate $G_0$. The outputs of gates $G_0$ and $G_1$ are connected together and to an output terminal 106 by a lead 104, constituting a one-lead output channel. Gate $G_0$ is armed through a control lead 110 by the 0 condition of a trigger circuit $T_1$, while gate $G_1$ is armed through a control lead 111 by the 1 condition of $T_1$.

When an addend of +1 is to be added to an augend, a pulse is applied to a terminal 113, which is connected to the set input of $T_1$, and sets $T_1$ to its 1 condition, thereby arming $G_1$ and closing $G_0$. If the first augend digit is a 1, its combination with the addend 1 should produce a sum of 0 and a carry of +1 to the next higher order. The augend digit of 1 is represented by a pulse on lead 103, this pulse being blocked by $G_0$. The resulting absence of a pulse on the output terminal 106 during the corresponding digit interval represents a sum digit of 0, and the continued 1 condition of $T_1$ represents the carry of +1 to the next higher order. If the second augend digit is also a 1, its combination with the stored carry of +1 produces a sum of 0 and a new carry of +1. Similarly, a sum of 0 and a carry of +1 are produced in each order until a 0 occurs in the augend. The first digit of 0 in the augend is represented by a pulse on lead 102, this pulse being passed to the output terminal 106 by the armed gate $G_1$. The resulting pulse on the output terminal during the corresponding digit interval represents a sum of 1 (from the addition 0+1). There is no carry digit with this sum and, since there are no further 1's in the addend, there can be no further carries in the current addition. Therefore, means are provided for resetting $T_1$ to 0 in response to the first 0 pulse in the augend. Accordingly, a lead 112 connects the 0's input lead 102 to the reset terminal of $T_1$. When the first 0's pulse in the augend resets $T_1$ to 0, it arms $G_0$ and closes $G_1$, so that subsequent 1's pulses in the augend are passed through $G_0$ while subsequent 0's pulses in the augend are blocked by $G_1$; therefore, each subsequent augend digit produces an identical sum digit.

If it is desired to add +1 to some order of the augend other than the lowest order, an addend pulse is applied to lead 113 during the digit interval corresponding to the augend order preceding the selected order. The adder then operates upon the remaining digits of the augend as hereinabove described.

DOWNCOUNT ONE-ADDER

Figure 6:
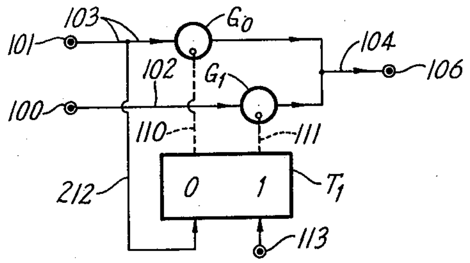
Fig. 6 is a block diagram of a downcount one-adder.

Referring to Fig. 6, the downcount one-adder includes many components similar to those in the upcount one-adder (Fig. 5), like parts being identically numbered in both figures. The principal change in structure is the substitution of a lead 212, in the downcount one-adder, in place of the lead 112 in the upcount one-adder. In Fig. 5, lead 112 connects the 0's input of the augend to the reset terminal $T_1$, but in Fig. 6, lead 212 connects the 1's input of the augend to the same reset terminal of $T_1$. Therefore, in the circuit of Fig. 6, the initial 1 entered into $T_1$ remains until the first 1 occurs in the augend. Since the addend value is −1 in this case, the addition of it to an initial 0 in the augend produces a sum of 1 with a carry of −1, and this carry continues through all orders until it is cancelled by the first 1 occurring in the augend. In all other respects, the operation of this circuit is the same as that of the upcount one-adder.

ALGEBRAIC ONE-ADDER

Figures 7, 8:
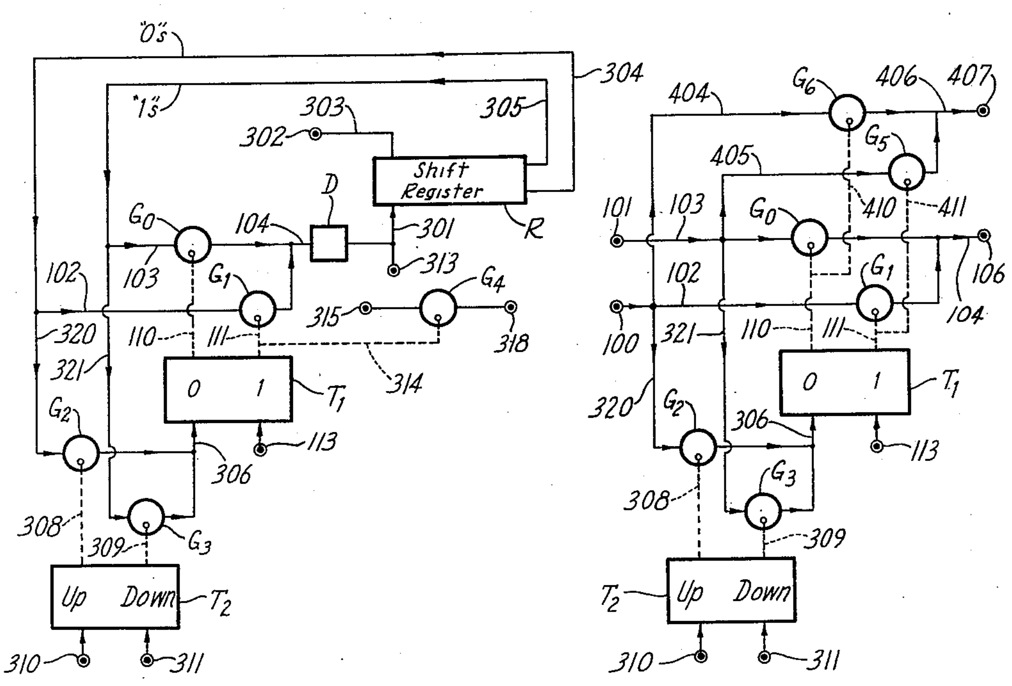
Fig. 7 is a block diagram of a circuit used to selectively combine either +1 or −1 to a binary word, thereby producing an output having characteristics different from the outputs of the circuits shown in Figs. 5 and 6.
Fig. 8 is a block diagram of a simplified embodiment of a circuit used to count word times either additively or subtractively.

Referring to Fig. 7, the algebraic one-adder comprises: a one-adder adapted for selective upcount or downcount operation; a control circuit for selecting upcount or downcount operation; and a two-lead output channel.

The algebraic one-adder is primarily a composite of the upcount and downcount one-adders shown in Figs. 5 and 6. The circuit is conditioned for upcount or downcount operation by selectively resetting the trigger $T_1$ either from the 0's input (for upcount) or from the 1's input (for downcount). A control circuit is accordingly provided for selectively connecting the reset input of $T_1$ to either the 0's input or the 1's input, as follows.

The control circuit comprises a pair of gates $G_2$ and $G_3$, gate $G_2$ being armed through a control lead 308 by the reset condition of a trigger $T_2$, and gate $G_3$ being armed through a control lead 309 by the set condition of $T_2$. The reset condition of $T_2$ is designated "Up," and the set condition is designated "Down." The outputs from $G_2$ and $G_3$ are connected, in parallel, through a lead 306 to the reset terminal of $T_1$. Therefore, $T_2$ controls $G_2$ and $G_3$ for selectively gating 0's pulses (for an upcount operation) or 1's pulses (for a downcount operation) to the reset terminal of $T_1$, and the first 0 pulse (during upcount) or 1 pulse (during downcount) resets $T_1$ to 0, as described hereinbefore.

A terminal 310 is connected to the rest input of $T_2$ for receiving a control pulse to reset the trigger in preparation for an upcount operation, while a terminal 311 is connected to the set input of $T_2$ for receiving a control pulse to set the trigger in preparation for a downcount operation.

An additional feature of the circuit shown in Fig. 7 is a two-lead output channel. The 0's input lead 102 is connected by a lead 404 to the input of a gate $G_6$, and the 1's input lead 103 is connected by a lead 405 the input of a gate $G_5$. The outputs of gates $G_5$ and $G_6$ are connected, in parallel, through a lead 406 to an output terminal 407. Gate $G_6$ is armed through a control lead 410 by the 0 condition of $T_1$, and gate $G_5$ is armed through a control lead 411 by the 1 condition of $T_1$. It will be seen that $G_0$ and $G_5$ are both interrogated by 1's input pulses, but are armed by opposite states of $T_1$; similarly $G_1$ and $G_6$ are both interrogated by 0's input pulses but are armed by opposite states of $T_1$. Therefore, since the combined pulse output from $G_0$ and $G_1$ represents the 1's in the sum, as previously described, the combined pulse output from $G_5$ and $G_6$ represents the inverse, i. e., the 0's in the sum, and the collective output from all four of the above gates, on the two output terminals 106 and 407, represents all digits of the sum.

To add a +1 to the augend, a control pulse is applied to terminal 310 for setting trigger $T_2$ to its Upcount condition thereby arming $G_2$ and closing $G_3$. The +1 addend is entered at terminal 113 and sets $T_1$ to 1, thereby arming $G_1$ and $G_5$ and closing $G_0$ and $G_6$. If the first digit of the augend is a 1, it is applied to terminal 101 and passes through $G_5$, causing a 0 pulse to occur in the sum output at terminal 407. If the next digit of the augend is a 1, then a 0 pulse will again appear at output terminal 407. A 0 pulse will occur at terminal 407 in response to each subsequent augend digit of 1. When the first 0 pulse of the augend is applied to terminal 100, it passes through $G_1$, causing a 1 pluse to occur in the sum output at terminal 106, thereby completing the carry. $G_2$ also passes the 0 pulse from terminal 100 for resetting $T_1$ to its 0 condition. After $T_1$ has been reset, $G_0$ and $G_6$ are armed and $G_1$ and $G_5$ are closed, and each subsequent 1 pulse on terminal 101 is passed by $G_0$ causing a 1 pulse to occur in the output sum at terminal 106; and each subsequent 0 pulse on terminal 100 is passed by $G_6$ causing a 0 pulse to occur in the output sum at terminal 407.

If the first digit of the augend is a 0 instead of a 1, a 0 pulse is applied to terminal 100 and passed by $G_1$ causing a 1 pulse to occur in the output sum at terminal 106. $G_2$ also passes the 0 pulse for resetting $T_1$ to 0, thereby arming $G_0$ and $G_6$ and closing $G_1$ and $G_5$. Since no subsequent carry can occur, 0 pulses appear at output terminal 407 in response to subsequent 0 pulses applied to input terminal 100 and 1 pulses appear at output terminal 106 in response to 1 pulses subsequently applied to input terminal 101.

If an addend of $-1$ is to be added to the augend, a control pulse is applied to terminal 311 thereby setting $T_2$ to its Downcount condition thereby arming $G_3$ and closing $G_2$. The addend of $-1$ is entered at terminal 113, and sets $T_1$ to 1 thereby arming $G_1$ and $G_5$ and closing $G_0$ and $G_6$. If the first digit of the augend is a 0, it is applied to terminal 100 and passes through $G_1$, causing a 1 pulse to occur in the output difference at terminal 106. A 1 pulse will continue to occur at terminal 106 in response to each successive 0 input pulse at terminal 100. When the first 1 pulse is applied to 101, it passes through $G_5$, causing a 0 pulse to appear at output terminal 407. The 1 pulse also passes through $G_3$ and resets $T_1$ to 0, thereby completing the carry. In the 0 condition, $T_1$ arms $G_0$ and $G_6$ and closes $G_1$ and $G_5$. Each 1 pulse subsequently applied to input terminal 101 causes a 1 pulse to appear at output terminal 106, and each 0 pulse subsequently applied to input terminal 100 causes a 0 pulse to appear at output terminal 407.

If the first digit of the augend is a 1 instead of a 0, a 1 pulse is applied to input terminal 101 and passes through $G_5$ to the 0 output terminal 407. The pulse also passes through $G_3$ and resets $T_1$ to 0 thereby arming $G_0$ and $G_6$ and closing $G_1$ and $G_5$. Since no subsequent carries can occur, each subsequent input digit of 0 produces an output digit of 0, and each subsequent input digit of 1 produces an output digit of 1.

WORD TIME COUNTER

*Simplified embodiment*

Fig. 8 shows a word time counter comprising: an algebraic one-adder which performs either upcount or downcount operations similar to the operations hereinbefore described; a shift register which temporarily stores operands; and a detection circuit which indicates when a predetermined number of word times have been counted.

A word initially entered into the shift register is circulated digit-by-digit, once each word time, through the adder and back into the register. During each pass through the adder, the word is combined with $+1$ or $-1$, according to the selected upcount or downcount operation, so that the current value of the word is a measure of the number of elapsed word times, or cycles. During an upcount operation, when the word has been circulated a sufficient number of times so that all of its digits are 1's, i. e., so that the register is "saturated" with 1's, the detection circuit is energized when the saturated word is passed through the adder, and causes a pulse to be transmitted through an output terminal, thereby indicating the desired count. For example, if a shift register having three stages initially contains the binary word 000, seven circulations, wherein a $+1$ is added each word time, must occur before the word is saturated with 1's, and detection occurs when the saturated word is passed through the adder during the eighth word time. Therefore, a word initially entered into such a register becomes saturated after a number of circulations equal to seven (binary 111) minus the initial word, and is detected after being passed through the adder during the next, or eighth word time. If it is desired to detect a fifth word time, the binary equivalent of the decimal $8-5=3$, or 011 is entered into the shift register. This value is circulated through the adder four times before the word becomes saturated with 1's, and the passing of the saturated word through the adder during the fifth word time is detected. In a register having $n$ binary stages, which are capable of representing $2^n$ different values, the word becomes saturated after $2^n-(1+x)$ word times, and detection occurs after $2^n-x$ word times, where $x$ is the word initially standing in the register.

It will be noted that if an upcount operation is employed to detect the occurrence of a given number of word times, the complement of that number, rather than its true value, must be initially entered into the register. In order to avoid complementing the initial word, the circuit may be operated in downcount, in which case the word eventually becomes saturated with 0's, and the saturated word is detected when it is passed through the adder. But it will be seen that the word becomes saturated with 0's after it has been circulated a number of times equal to its value, and the saturated word is not detected until the next word time. Therefore, in order to detect the occurrence of $x$ word times the word $x-1$ must be initially entered into the register. A preferred embodiment of the word time counter, to be described hereinafter, is adapted to detect the occurrence of the word time equal to the value of the initially entered word.

Referring to Fig. 8, the algebraic one-adder, its control circuit for selecting upcount or downcount operation, and the shift register may be of the types previously described.

The detection circuit comprises a gate $G_4$ having an input terminal 315 and an output terminal 318. Gate $G_4$ is armed through a control lead 314 when $T_1$ is set to 1.

The adder output lead 104 is connected through a delay line D to a 1's input lead 301 of the shift register R, so that each sum digit from the adder is entered into the shift register. A 0's output lead 304 from register R is connected to the 0's input lead 102 of the adder, and is connected by a lead 320 to the input of the upcount gate $G_2$. Similarly, a 1's output lead 305 from the register is connected to the 1's input lead 103 of the adder, and is connected by a lead 321 to the input of the downcount gate $G_3$.

Initially, register R contains all 0's and $T_1$ stands at 0. Prior to the occurrence of a first group of shift pulses, a control pulse is applied to either terminal 310 or 311, thereby causing $T_2$ to assume either its upcount or its downcount condition. Next, a word is shifted into register R through an input terminal 313 and the lead 301 when a first group of shift pulses are applied to the register through a terminal 302 and a lead 303. Since $T_1$ stands at 0 at this time, gate $G_0$ is armed and gate $G_1$ is closed; therefore, the all-0's word in register R is shifted through the adder, producing no adder output and adding nothing to the word being entered into the shift register. After entry of the word into register R, a pulse is applied to terminal 113, thereby setting $T_1$ to its 1 state and preparing the word counter to increase or decrease the R register word by unity during the next word interval, subsequent shift pulses applied to terminal 302 cause the word to be shifted out of the register through the 0's lead 304 and the 1's lead 305, and passed through the adder, where $+1$ or $-1$ is added to the word. The sum word is shifted back into the register through delay line D which is provided to permit the register to reach a stable state before it receives the first sum digit. After the word has been circulated, the shift pulses are temporarily discontinued between word groups and an interrogating pulse is applied to the input terminal 315 of the detection circuit. If $G_4$ is armed, thereby transmitting the pulse to the detection output terminal 318, this indicates that $T_1$ was not reset to 0 during the preceding cycle. It is recalled that $T_1$ is reset, during upcount, by the occurrence of any 0 in the augend word, and, during downcount, by the occurrence of any 1 in that word. Therefore, if $T_1$ remains set to 1 and a detection output pulse occurs, this indicates that the word is saturated with 1's during upcount or with 0's during downcount, and the desired condition is detected. If no detection output pulse occurs when $G_4$ is interrogated, the word is not saturated, and is therefore recirculated until a detection pulse does occur.

*Preferred embodiment*

It will be recalled that during a downcount operation with the circuit shown in Fig. 8, the initially entered word must have a value which is one less than the number of word times to be detected. In the present embodiment, the true value of the number of word times to be detected may be initially entered into the register.

Figure 9:
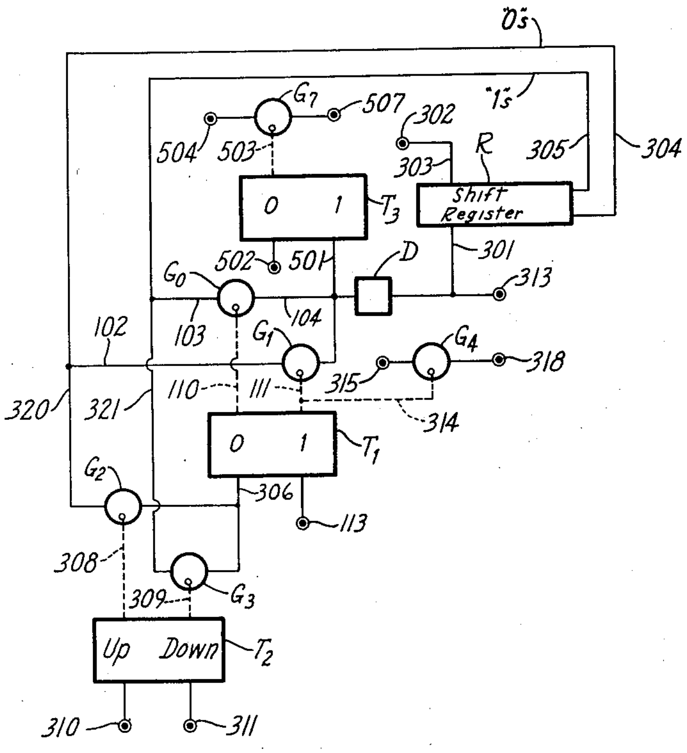
Fig. 9 is a block diagram of a preferred embodiment of the word time counter.

Referring to Fig. 9, the preferred embodiment of the word time counter is similar in all respects to the circuit shown in Fig. 8 except for an additional detection circuit which is employed only during a downcount operation. This detection circuit comprises a trigger $T_3$, the set input of which is connected by a lead 501 to the output lead 104 of $G_0$ and $G_1$, so that any pulse transmitted on lead 104 (representing a sum digit of 1) sets $T_3$ to 1. A terminal 502 is provided for receiving a control pulse to reset $T_3$ to 0. The 0 state of $T_3$ arms a detection gate $G_7$ through a control lead 503. A detection input terminal 504 is connected to the input of $G_7$, and a detection output terminal 507 is connected to the output of gate $G_7$.

When a predetermined number of word times is to be detected by a downcount operation, a word whose value equals the number to be detected is entered into the shift register in the manner previously described. The 1's pulses applied to terminal 313 are transmitted through delay line D and lead 501 to the set terminal of trigger $T_3$. Thus, trigger $T_3$ is set to 1 if any digit 1 is entered into the register. The previously described control pulse, which is applied to terminal 310 or 311 for conditioning trigger $T_2$ is simultaneously applied to terminal 504 for interrogating the detection gate $G_7$. If $G_7$ is armed, thereby transmitting the pulse to the output terminal 507, this indicates that the word initially entered into the register was all 0's and the word value is properly detected after 0 word times, i. e., before the word has been passed through the one-adder. If $G_7$ is closed, no pulse is transmitted to the output terminal 507. A second control pulse is applied to terminal 113 for setting $T_1$ to 1, and is applied to terminal 502 for resetting $T_3$ to 0. The initial word is then shifted from the register through the adder and back into the register. If the sum word on lead 104 contains all 0's, the next detection pulse (which is applied to terminal 504 after the first pass of the word through the one-adder) is transmitted to the output terminal 507. But if at least one digit 1 occurs in the sum word, the pulse which represents that digit 1 on lead 104 sets $T_3$ to 1, thereby closing $G_7$ which then blocks the detection pulse. The word is recycled until the sum word is saturated with 0's, this condition being detected through $G_7$ after the word time in which the saturated word was formed, rather than after the next word time, as was the case with the circuit shown in Fig. 8.

I claim:

1. In a device of the class described, the combination of: an element having first and second stable states of operation; means for initially setting said element to its second state; a first gate having an input and an output; means for arming said first gate in response to the first state of said element; a second gate having an input and an output; means for arming said second gate in response to the second state of said element; a first pulse input means connected to the input of the first gate; a second pulse input means connected to the input of the second gate; a pulse output means joining the outputs of the first and second gates; and a connection from the second pulse input means to said element for resetting the latter to its first state in response to a pulse from said second pulse input means.

2. In a device of the class described, the combination of: an element having first and second stable states of operation; means for initially setting said element to its second state; a first gate having an input and an output; means for arming said first gate in response to the first state of said element; a second gate having an input and an output; means for arming said second gate in response to the second state of said element; a first pulse input means connected to the input of the first gate; a second pulse input means connected to the input of the second gate; a pulse output means joining the outputs of the first and second gates; and a connection from the first pulse input means to said element for resetting the latter to its first state in response to a pulse from said first pulse input means.

3. In a device of the class described, the combination of: an input channel comprising first and second leads; means for applying input signals to the first and second leads; an output channel; a gating circuit normally effective to maintain the first lead operatively disconnected from the output channel and the second lead operatively connected to the output channel; control means effective, upon being energized, for modifying said gating circuit to operatively connect the first lead to the output channel and for operatively disconnecting the second lead from the output channel; and means for energizing said control means in response to the application of a first input signal to the second lead.

4. In a device of the class described, the combination of: an input channel comprising first and second leads; means for applying input signals to the first and second leads; an output channel; a gating circuit normally effective to maintain the first lead operatively disconnected from the output channel and the second lead operatively connected to the output channel; control means effective, upon being energized, for modifying said gating circuit to operatively connect the first lead to the output channel and for operatively disconnecting the second lead from the output channel; and means for energizing said control means in response to the application of a first input signal to the first lead.

5. In a device of the class described, the combination of: first and second input leads; means for applying signals to the first and second input leads; first and second output leads; a gating circuit normally effective to operatively connect the first input lead to the second output lead and the second input lead to the first output lead; a control circuit effective, upon being energized, to modify the gating circuit for operatively connecting the first input lead to the first output lead and the second input lead to the second output lead; and means for energizing said control circuit in response to the application of a first signal to the second input lead.

6. In a device of the class described, the combination of: first and second input leads; means for applying signals to the first and second input leads; first and second output leads; a gating circuit normally effective to operatively connect the first input lead to the second output lead and the second input lead to the first output lead; a control circuit effective, upon being energized, to modify the gating circuit for operatively connecting the first input lead to the first output lead and the second input lead to the second output lead; and means for energizing said control circuit in response to the application of a first signal to the first input lead.

7. In a device of the class described, the combination of: a first element having first and second stable states of operation; means for initially setting said first element to its second state; a first gate having an input and an output; means for arming said first gate in response to the first state of said first element; a second gate having an input and an output; means for arming said second gate in response to the second state of the first element; a first pulse input means connected to the input of the first gate; a second pulse input means connected to the input of the second gate; a pulse output means joining the outputs of the first and second gates; a second element having first and second stable states of operation; means for selectively causing said second element to assume either its first or second state; a third gate having an input and an output; means for arming said third gate in response to the first state of the second element, a fourth gate having an input and an output; means for arming said fourth gate in response to the second state of the second element; means connecting the first pulse input means to the input of the fourth gate; means connecting the second pulse input means to the input of the third gate; resetting means effective, upon the receipt of a pulse, for resetting the first element to its first state; and means connecting the outputs of the third and fourth gates to said resetting means.

8. In a device of the class described, the combination of: first and second input leads; means for applying input signals to the first and second input leads; an output lead; a gating circuit normally effective to maintain the first input lead operatively disconnected from the output lead and the second input lead operatively connected to the output lead; control means effective, upon being energized, for modifying said gating circuit to operatively connect the first input lead to the output lead and to operatively disconnect the second input lead from the output lead; energizing means having first and second states, said energizing means being operable in its first state for energizing said control means in response to the application of a first input signal to the second input lead, and said energizing circuit being operable in its second state for energizing the control circuit in response to the application of a first input signal to the first input lead; and selectively operable means for causing said energizing means to assume either its first or its second state.

9. In a device of the type described, the combination of: a binary register; means for entering a multidigit binary word into the register; an adder; means for repetitively cycling said word from the register through the adder and back into the register for adding the value 1 to said word during each cycle; and means connected to the adder and controlled thereby for detecting the occurrence of a predetermined value of said word, said predetermined value comprising all 1's.

10. In a device of the type described, the combination of: a binary register; means for entering a multidigit binary word into the register; an adder; means for repetitively cycling said word from the register through the adder and back into the register for adding the valve −1 to said word during each cycle; and means connected to the adder and controlled thereby for detecting the occurrence of a predetermined value of said word, said predetermined value comprising all 0's.

11. In a device of the type described, the combination of: a register; means for entering a plural order word into the register; an arithmetic unit; means for repetitively cycling said word from the register through the arithmetic unit and back into the register for altering said word by a first predetermined value during each cycle; and means connected to the arithmetic unit and controlled thereby for detecting the occurrence of a second predetermined value of said word.

References Cited in the file of this patent

UNITED STATES PATENTS

| | | |
|---|---|---|
| 2,552,760 | Baker | May 15, 1951 |
| 2,610,790 | Elliott | Sept. 16, 1952 |
| 2,611,536 | Barrow | Sept. 23, 1952 |
| 2,693,593 | Crosman | Nov. 2, 1954 |

OTHER REFERENCES

Proceedings IRE for January 1952, pp. 29–33, emphasis on pages 31 and 32, Figs. 4 and 5 of article by Gray, Jr., entitled, Logical description of some digital-computer adders and counters.